United States Patent
Gami et al.

(10) Patent No.: US 7,253,985 B1
(45) Date of Patent: Aug. 7, 2007

(54) DELAY CLOCK TRACK READ BACK DATA TO COMPENSATE TIME VARIANCE DUE TO DISK THERMAL EXPANSION IN SPIRAL SERVO TRACK WRITING

(75) Inventors: Bipinchandra V. Gami, Northridge, CA (US); Joe Bragg, San Jose, CA (US); Nikolay Ivanov, San Jose, CA (US); Linh Nguyen, San Jose, CA (US); Kwong Tat Chan, Pleasanton, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/369,600

(22) Filed: Mar. 6, 2006

(51) Int. Cl.
*G11B 21/02* (2006.01)
*G11B 5/09* (2006.01)
*G11B 5/596* (2006.01)

(52) U.S. Cl. .................. 360/75; 360/51; 360/77.08

(58) Field of Classification Search ............ None
See application file for complete search history.

(56) References Cited

U.S. PATENT DOCUMENTS 5,748,398 A * 5/1998 Seo .................... 360/51

* cited by examiner

*Primary Examiner*—Andrea Wellington
*Assistant Examiner*—Jason Olson
(74) *Attorney, Agent, or Firm*—Ben J. Yorks; Irell & Manella LLP

(57) ABSTRACT

A method for writing servo information onto a disk of a hard disk drive with a servo writer. The disk has a circumferential index and a band of servo reference tracks. The circumferential index is detected from a clock signal generated from a clock track of the disk. The reference tracks include radial indices. A spiral servo pattern is written upon the detection of the circumferential index and a radial index. The servo writer includes a phase detector that detects changes in the relative position of the circumferential and radial indices and a delay circuit that delays the clock signal to offset such changes.

23 Claims, 6 Drawing Sheets

DELAY CLOCK TRACK READ BACK DATA TO COMPENSATE TIME VARIANCE DUE TO DISK THERMAL EXPANSION IN SPIRAL SERVO TRACK WRITING

BACKGROUND OF THE INVENTION

1. Field of the Invention

The present invention relates to a method for writing servo onto disks of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored on radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification, respectively.

Each sector may have also a servo field 5 located adjacent to a data field 6. The servo field 5 contains a plurality of servo bits A, B, C and D that are read and used to position the head 7 relative to the track.

The fields 1–5 are written onto the disk surfaces during the manufacturing process of the disk drive. These fields are typically written with a servo writer. The servo tracks are sometimes written using a number of spiral servo tracks initially written onto the disks. FIG. 2 shows an example of a number of spiral servo tracks written onto a disk. Using spiral servo tracks is sometimes referred to as an Ammonite servo write process. The spiral servo tracks are used to write the final radial servo tracks that are utilized during the normal operation of the disk drive.

As shown in FIG. 2, the radial start point of each spiral track may vary. This variation in start points may be caused by system vibration, servo track writer positioning errors and other factors. The variation of the start points will vary the location of the spiral track and ultimately create inaccuracies in the final servo pattern. Inaccurate servo can lower the density and degrade the performance of the drive. It would be desirable to improve the accuracy of spiral servo tracks used to write radial servo patterns.

One approach to achieving a common spiral track start point has been to include a clock track that contains a circumferential index, and a band of conventional servo tracks that include a radial index. The clock track is read by a clock head of a servo writer. The reference tracks are read by the heads of the drive. A spiral servo track is written when the circumferential index and the radial index are both detected.

The writing of spiral tracks can take up to 10 minutes. The spindle motor which spins the disk generates heat, some of which is transferred into the disk. The heat will cause the disk to thermally expand. The thermal expansion will move the relative position of the circumferential and radial indices. The relative movement in indices may change the start point for subsequently written spiral tracks leading to inaccurate servo writing. It would be desirable to compensate for this movement of the indices during a servo write routine.

BRIEF SUMMARY OF THE INVENTION

A method and apparatus for writing servo onto a disk of a hard disk drive. The method includes writing a servo pattern in response to the detection of a circumferential index and a radial index on the disk. The apparatus includes a circuit with a phase detector that detects any phase difference in the location of the indices. The detection phase difference is used to synchronize the detected indices.

DETAILED DESCRIPTION

Disclosed is a method for writing servo information onto a disk of a hard disk drive with a servo writer. The disk has a circumferential index and a band of servo reference tracks. The circumferential index is detected from a clock signal generated from a clock track of the disk. The reference tracks include radial indices. A spiral servo pattern is written upon the detection of the circumferential index and a radial index. The servo writer includes a phase detector that detects changes in the relative position of the circumferential and radial indices and a delay circuit that delays the clock signal to offset such changes. The phase detector and delay circuit compensate for movement of the indices due to thermal expansion of the disk.

Figure 3:
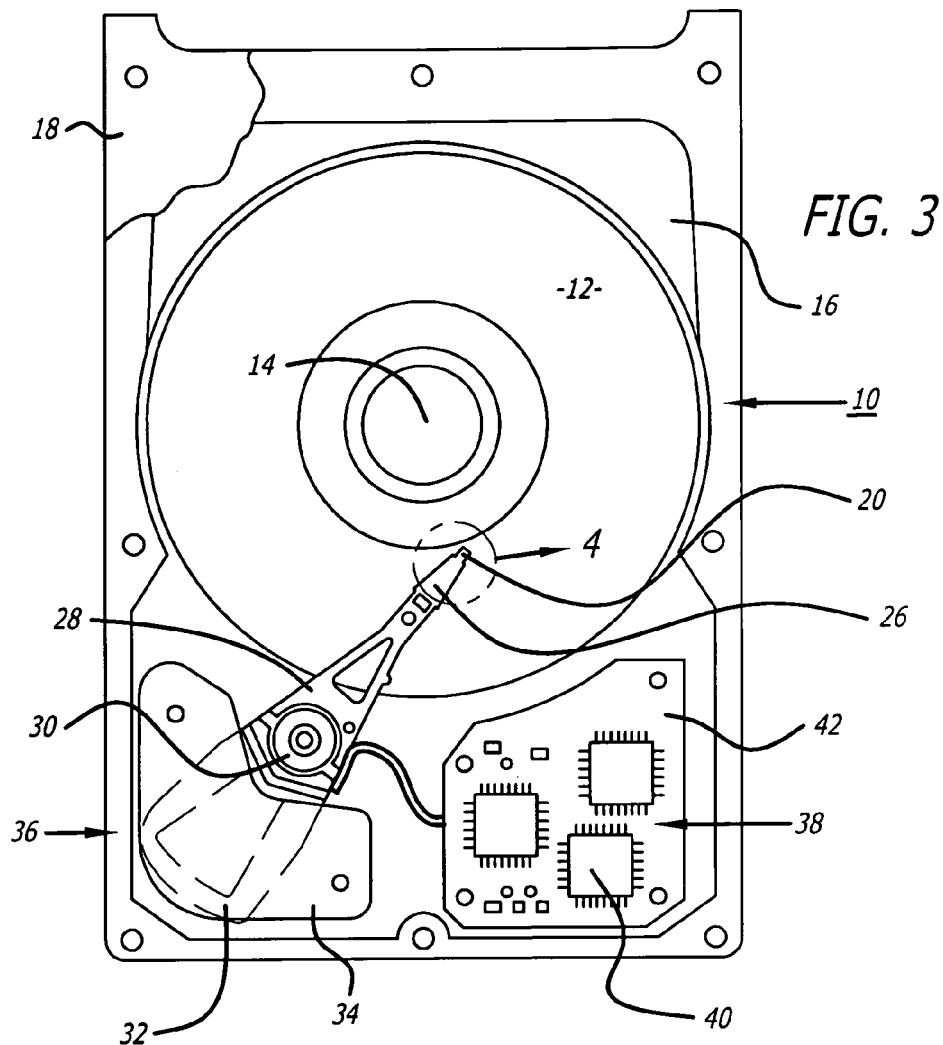
FIG. 3 is a top view of an embodiment of a hard disk drive.

Referring to the drawings more particularly by reference numbers, FIG. 3 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 4:
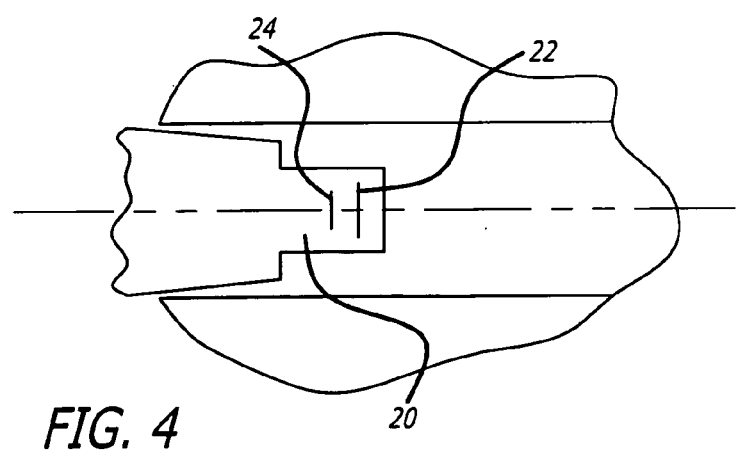
FIG. 4 is a top enlarged view of a head of the hard disk drive.

The disk drive 10 may include a plurality of heads 20 located adjacent to the disks 12. As shown in FIG. 4 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Referring to FIG. 3, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 5:
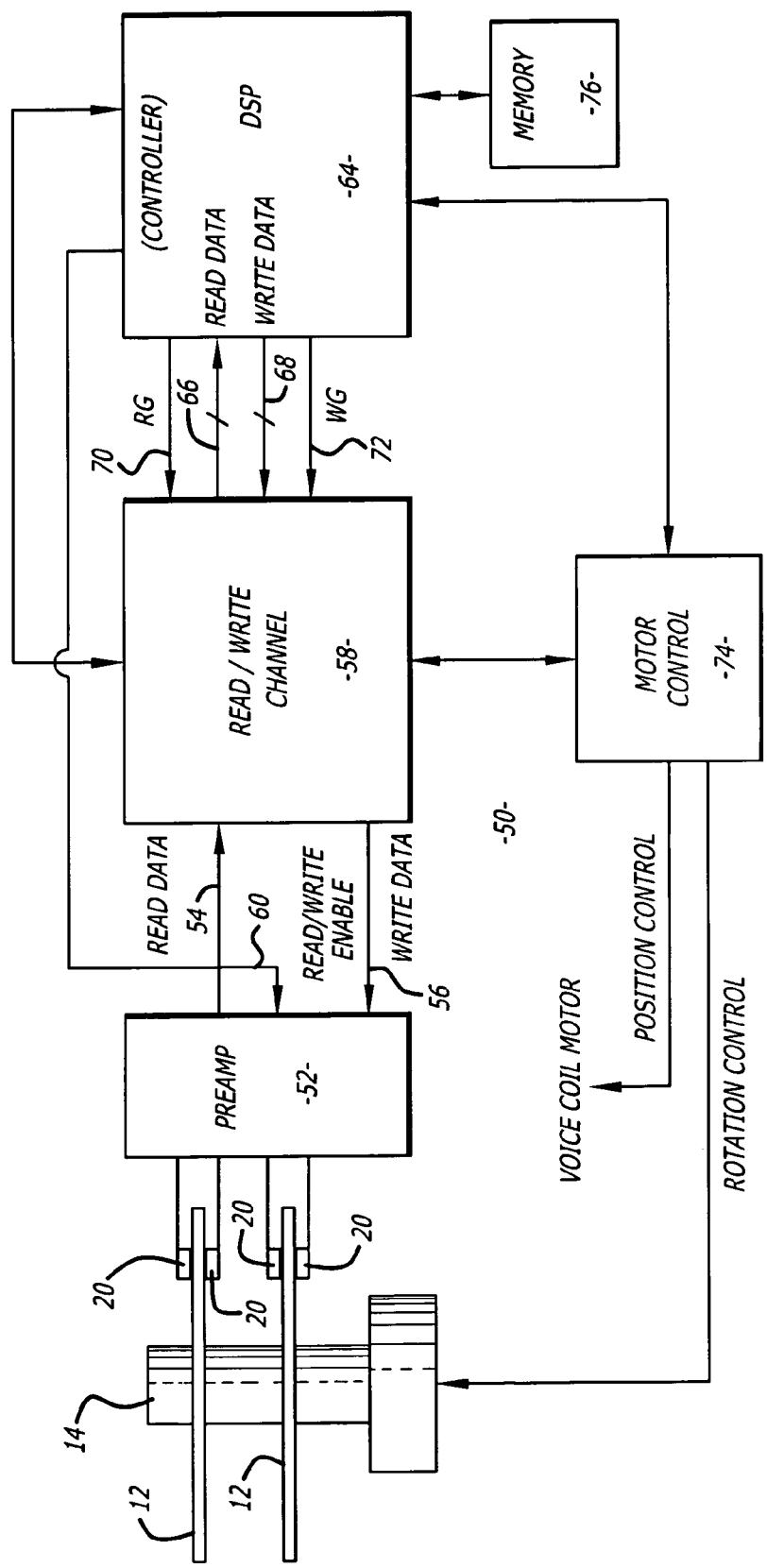
FIG. 5 is a schematic of an electrical circuit for the hard disk drive.

FIG. 5 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is the be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

Figure 6:
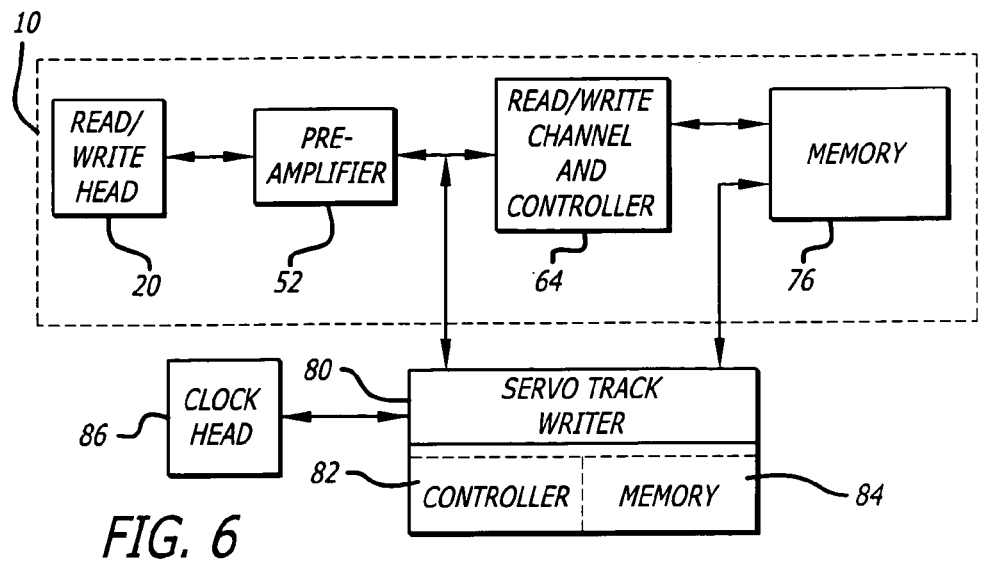
FIG. 6 is a schematic showing a servo writer connected to the hard disk drive.

During the manufacturing process of the disk drive 10 servo information must be written onto the disks 12. This is typically done with a servo track writer 80. FIG. 6 shows a servo track writer 80 connected to a hard disk drive 10. The servo track writer 80 may include a controller 82, memory 84 and other circuitry for writing servo information onto the disk(s) of the disk drive. The servo writer 80 may utilize the pre-amplifier, read/write channel, etc. of the disk drive to both write servo information, and to read servo information to position a head onto a track of the disk(s). The servo writer 80 also has a separate clock head 86 that can write and read a clock track of a disk.

Figure 1:
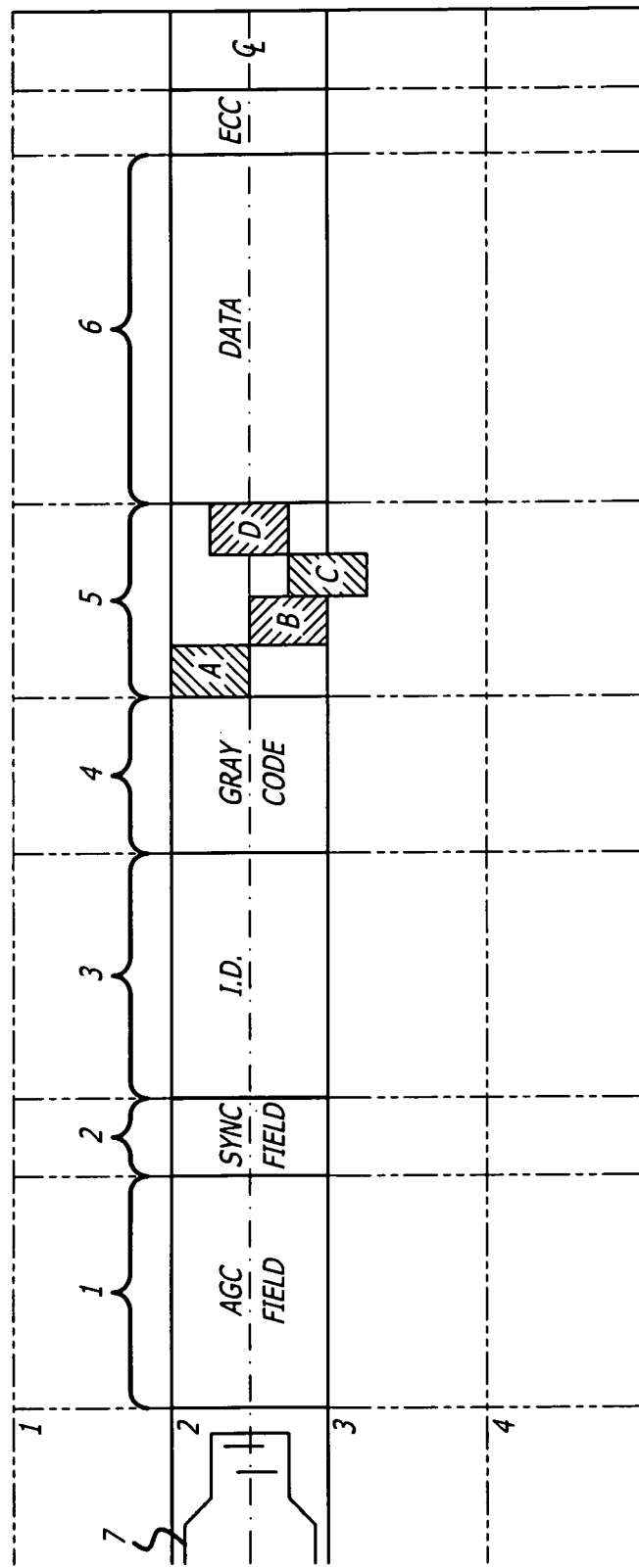
FIG. 1 is an illustration of a track of the prior art.
Figure 7:
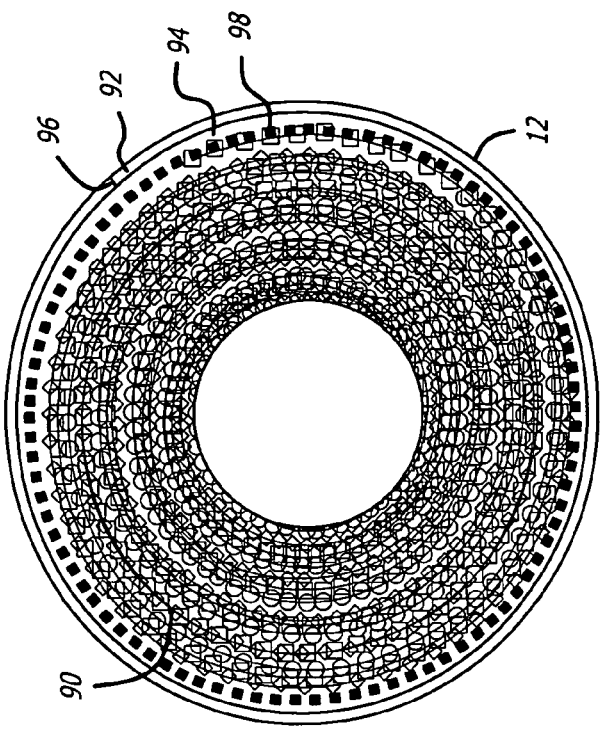
FIG. 7 is a disk with a plurality of spiral servo tracks and clocking information used to start the writing of the servo tracks.
Figure 2:
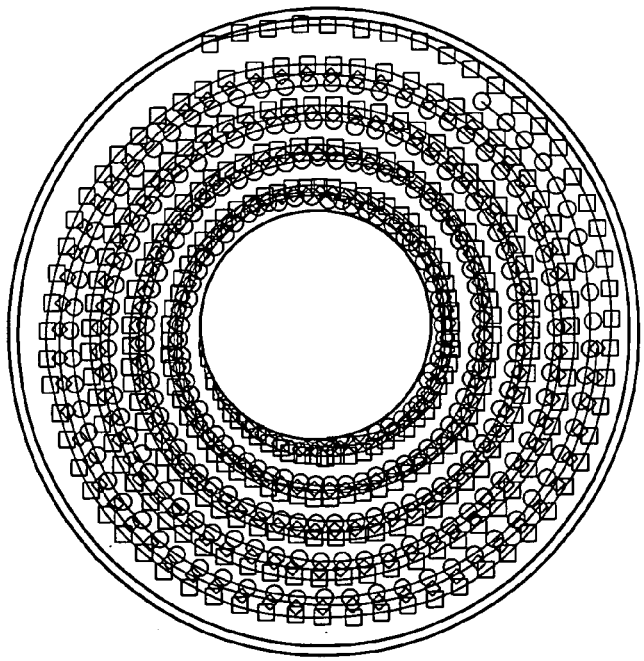
FIG. 2 is an illustration showing a plurality of spiral servo tracks written onto a disk in the prior art.

FIG. 7 shows a disk 12 with written spiral servo tracks 90. The disk 12 has an outer clock track 92 and a band of servo reference tracks 94. The clock track 92 contains a circumferential index 96. The reference tracks 94 include radial indices 98. The radial indices may be markers that indicate the first sector of a track.

Figure 8:
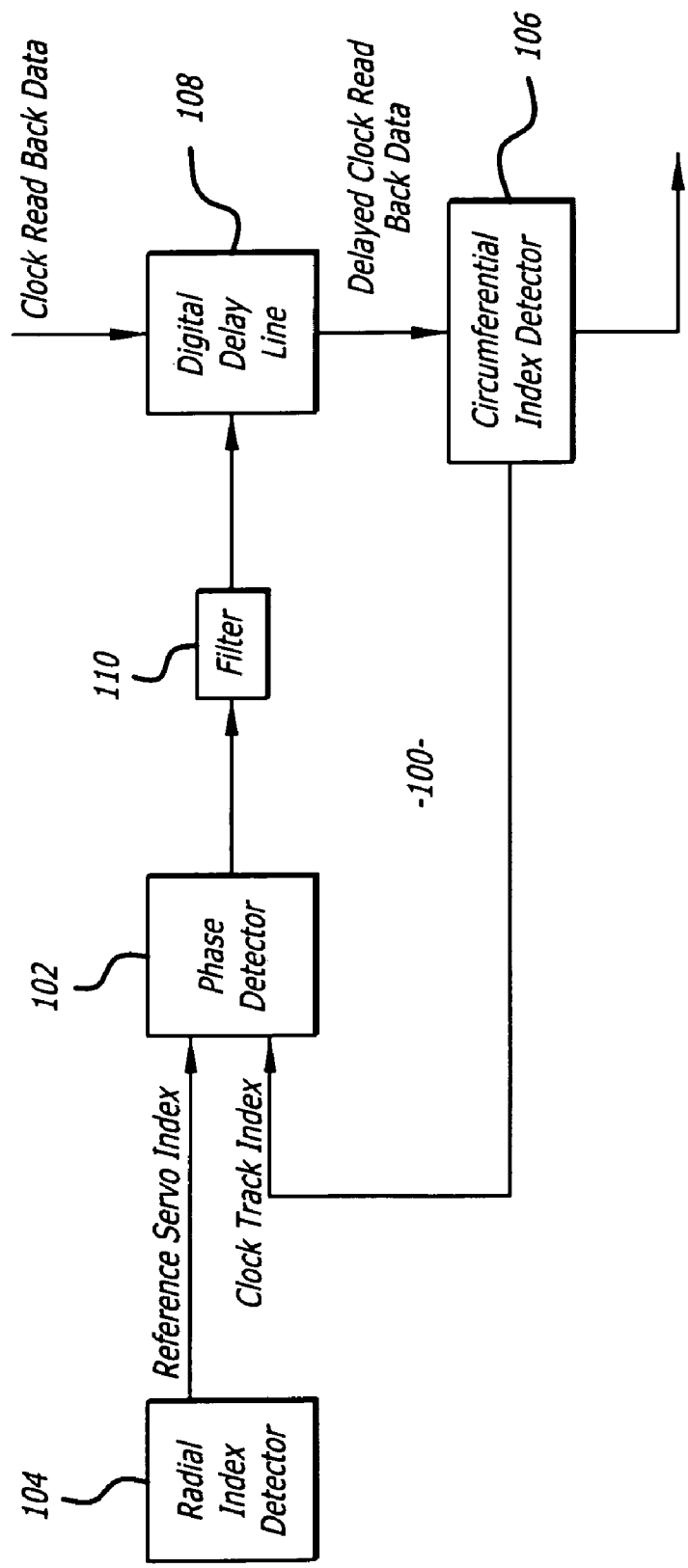
FIG. 8 is a schematic of a phase delay circuit of the servo writer.

FIG. 8 is a schematic of a phase delay circuit 100 that can compensate for relative movement between the circumferential index and the radial indices due to thermal expansion of the disk. The circuit 100 includes a phase detector 102 that receives a radial index signal at one input and a circumferential index at the other input. The radial index signal is provided when a radial index of the disk is detected by a radial index detector (104). The circumferential index signal is generated when the circumferential index of the disk is detected by a circumferential index detector 106. The circumferential index is detected from a clock signal read from the clock track of the disk through the clock head 86 of the servo writer. The read back signal may be digitized before being provided to the phase delay circuit 100. The radial index is detected from a reference signal provided by the head 20 of the drive. The controller of the servo writer is coupled to the detectors 104 and 106.

The output of the phase detector 102 corresponds to the phase difference between the detection of the two index signals. The output of the phase detector 102 is provided to a digital delay circuit 108. The phase detector output may be filtered by filter 110. The digital delay line 108 delays the clock read back signal by a value that corresponds to the phase difference detected by the phase detector 102. The digital delay line 108 may include a register that stores the value of the phase difference. The register may be updated by the phase detector after each cycle of indices detection.

By way of example, when the servo process begins at time t=0 the phase difference may be zero. That is the circumferential and radial index are detected at the same time. At time t=1 the circumferential and radial indices may move relative to each other so that the indices are not detected at the same time. This difference in phase is detected by the phase detector 102 and stored by the delay line 108. The delay line 108 delays the clock signal to synchronize the subsequent detection of the indices. The outputs of the radial and circumferential index detectors are provided to the controller 82. The controller 82 writes a spiral servo track when both indices are detected. It is desirable to synchronize the indices because a spiral servo track is not written until both indices are detected. The phase delay circuit 100 continuously detects phase differences between the detection of the indices and delays the clock signal to synchronize index detection. The synchronized index detection minimizes variations in the circumferential spacing between spiral tracks.

Figure 9:
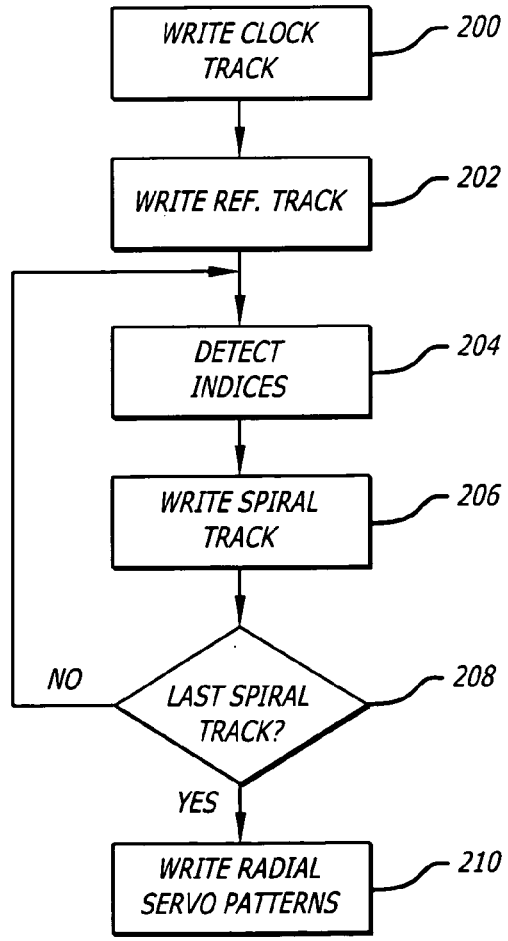
FIG. 9 is a flowchart describing a process to write a servo pattern onto a disk of the drive.

FIG. 9 is a flowchart describing the writing of reference information onto the disk(s) with the servo track writer. In block 200 a clock track is written onto an outer portion of the disk. The clock track may contain a sinusoidal signal. The circumferential index may be a portion of the sinusoidal signal that has a different frequency. The writing of the clock track can be performed by the servo writer controller through the clock head 86.

In block 202 a reference servo pattern is written at the reference radial position. To write the reference pattern, the head(s) of the drive is initially moved to a reference position. The reference position may be at the outer diameter, or the inner diameter, of the disk. The reference position may be established by the crash stop location of the drive. A plurality of servo patterns may be written to create a reference track. Additionally, several servo tracks may be written to create a band of reference servo tracks. The creation of the reference servo information can be caused by the controller of the servo track writer.

In block 204 the clock head reads the clock track and the head(s) of the disk drive are used to read the servo reference tracks to detect the circumferential index and the radial index, respectively. The controller of the servo track writer may utilize the servo capabilities of the disk drive to position the head(s). Upon detection of the indices the servo writer causes a spiral servo track to be written onto the disk(s) in block 206. The servo track writer controller then determines whether the last spiral servo track has been written in process block 208. If not, another spiral servo track is written onto the disk(s) after detection of the circumferential and radial indices. Using the indices insures that the spiral servo tracks have approximately the same circumferential spacing. This improves the accuracy of the spiral tracks and the resultant radial servo tracks used by the drive. An increase in the accuracy of the servo information may lead to an increase in the density of the drive.

If the last spiral servo track has been written, then the servo writer writes radial servo tracks using the spiral servo track for positioning information in block 210. The radial servo tracks are used to position the heads during the normal operation of the drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, although a delay circuit for delaying the clock track signal is shown and described, it is to be understood that the indices may be synchronized by delaying the signal from the reference tracks.

What is claimed is:

1. A method for writing servo information onto a disk of a hard disk drive, comprising:
   generating a clock signal from the disk with a clock head;
   detecting a first circumferential index signal from the clock signal;
   generating a reference signal from the disk with a disk drive head;
   detecting a first radial index signal from the reference signal;
   writing a first spiral servo track onto the disk in response to the detection of the first circumferential index signal and the first radial index signal;
   detecting a first phase difference between the first circumferential index signal and the first radial index signal;
   detecting a second circumferential index signal from the delayed clock read back signal;
   detecting a second radial index signal;
   synchronizing the detected second circumferential and second radial index signals with the first phase difference; and,
   writing a second spiral servo track onto the disk in response to the synchronized second circumferential and second radial index signals.

2. The method of claim 1, wherein the clock signal is read from a clock track of the disk.

3. The method of claim 1, wherein the second circumferential and radial index signals are synchronized by delaying the clock signal before detection of the second circumferential index signal.

4. The method of claim 1, wherein the radial indexes are detected from a band of reference servo data on the disk.

5. The method of claim 1, further comprising writing radial servo patterns with the first and second spiral servo tracks.

6. A servo writer that writes servo information onto a disk of a hard disk drive that has a head, comprising:
   a clock head that reads a clock track of the disk;
   a circumferential index detector coupled to said clock head;
   a radial index detector coupled to the head of the hard disk drive;
   a phase detector coupled to said circumferential index detector and said radial index detector;
   a delay line circuit coupled to said phase detector, said clock head and said circumferential index detector; and,
   a controller coupled to said radial index detector and said circumferential index detector.

7. The servo writer of claim 6, further comprising a filter coupled to said phase detector.

8. The servo writer of claim 6, wherein said controller is coupled to an output of said circumferential index detector.

9. The servo writer of claim 6, wherein an output of said circumferential index detector and an output of said radial index detector are connected to a pair of inputs of said phase detector.

10. The servo writer of claim 6, wherein said delay circuit includes a delay value that is updated by said phase detector.

11. A servo writer that writes servo information onto a disk of a hard disk drive that has a head that generates a reference signal, comprising:
    a clock head that reads a clock track of the disk and generates a clock signal;
    circumferential index detector means for detecting a circumferential index from said clock signal;
    radial index means for detecting a radial index from the reference signal;
    phase detector means for determining a phase difference between the circumferential index and the radial index;
    delay means for delaying the clock signal provided to said circumferential detector means as a function of said phase difference; and,
    controller means for writing a servo pattern onto the disk in response to detection of said circumferential index and said radial index.

12. The servo writer of claim 11, further comprising a filter coupled to said phase detector means.

13. The servo writer of claim 11, wherein said controller means is coupled to an output of said circumferential index means.

14. The servo writer of claim 11, wherein an output of said circumferential index detector means and an output of said radial index detector means are connected to a pair of inputs of said phase detector means.

15. The servo writer of claim 11, wherein said delay circuit means includes a delay value that is updated by said phase detector means.

16. A circuit of a servo writer that writes servo information onto a disk of a hard disk drive that has a head, the servo writer including a clock head, comprising:
    a circumferential index detector coupled to the clock head;
    a radial index detector coupled to the head of the hard disk drive;
    a phase detector coupled to said circumferential index detector and said radial index detector; and,
    a delay line circuit coupled to said phase detector, the clock head and the circumferential index detector.

17. The circuit of claim 16, further comprising a filter coupled to said phase detector.

18. The circuit of claim 16, wherein an output of said circumferential index detector and an output of said radial index detector are connected to a pair of inputs of said phase detector.

19. The circuit of claim 16, wherein said delay circuit includes a delay value that is updated by said phase detector.

20. A circuit for a servo writer that writes servo information onto a disk of a hard disk drive that has a head that generates a reference signal, the servo writer has a clock that generates a clock signal comprising:

circumferential index detector means for detecting a circumferential index from the clock signal;

radial index means for detecting a radial index from the reference signal;

phase detector means for determining a phase difference between the circumferential index and the radial index; and, delay means for delaying the clock signal provided to said circumferential detector means as a function of said phase difference.

21. The circuit of claim 20, further comprising a filter coupled to said phase detector means.

22. The circuit of claim 21, wherein an output of said circumferential index detector means and an output of said radial index detector means are connected to a pair of inputs of said phase detector means.

23. The circuit of claim 21, wherein said delay circuit means includes a delay value that is updated by said phase detector means.

* * * * *